United States Patent [19]

Tremblay

[11] Patent Number: 5,042,136

[45] Date of Patent: Aug. 27, 1991

[54] METHOD AND DEVICE TO ATTACH A BACKSPLASH TO A COUNTERTOP

[76] Inventor: Robert L. Tremblay, 2890 Parkwood, Ann Arbor, Mich. 48104

[21] Appl. No.: 418,112

[22] Filed: Oct. 6, 1989

Related U.S. Application Data

[62] Division of Ser. No. 79,345, Jul. 30, 1987, Pat. No. 4,881,844.

[51] Int. Cl.⁵ .............................................. B23P 19/02
[52] U.S. Cl. ..................... 29/525.1; 29/525; 312/140.4
[58] Field of Search ............... 29/464, 525.1; 403/407.1, 406.1, 353, 381, 245, 231, 375, 380, 397; 24/702, 669; 312/140.4

[56] References Cited

U.S. PATENT DOCUMENTS

| 3,596,942 | 8/1971 | Zoebelein | 403/407.1 |
| 3,894,377 | 7/1975 | Welch | 403/353 X |
| 4,470,716 | 9/1984 | Welch | 403/407.1 X |
| 4,473,316 | 9/1984 | Welch | 403/353 X |

Primary Examiner—Joseph M. Gorski
Attorney, Agent, or Firm—James M. Deimen

[57] ABSTRACT

A generally flat oblong clip pierced by a pair of countersunk oblong holes and a slot open to one of the longer edges. The slot and a terminating half-round hole are beveled and countersunk respectively from the opposite side of the clip. The junctures of the bevels and half-round countersink are specifically formed to provide a locking shoulder on each side of the half-round hole. Multiple clips are used to provide a blind fastening between a backsplash and countertop enabling the backsplash to be driven into permanent substantially watertight engagement with the countertop. The step by step installation of the clips assures that the backsplash also follows gentle curvatures in the building wall behind the backsplash. The clip slots are configured to tightly engage and latch mating screw heads as the backsplash is driven into position.

7 Claims, 3 Drawing Sheets

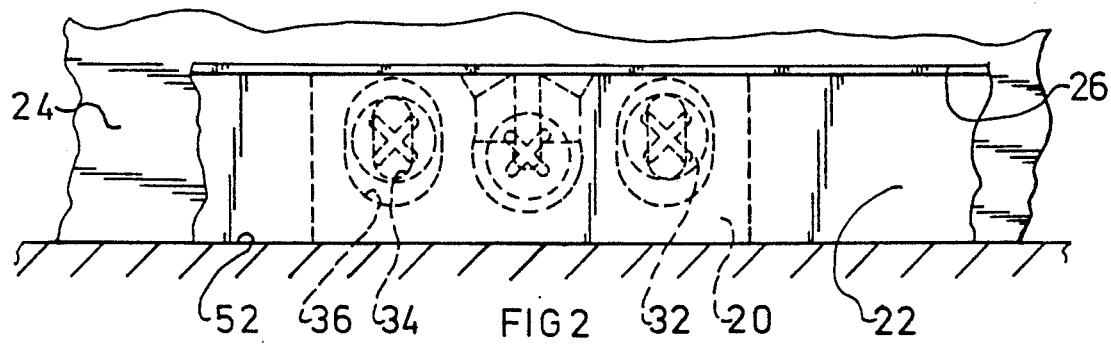
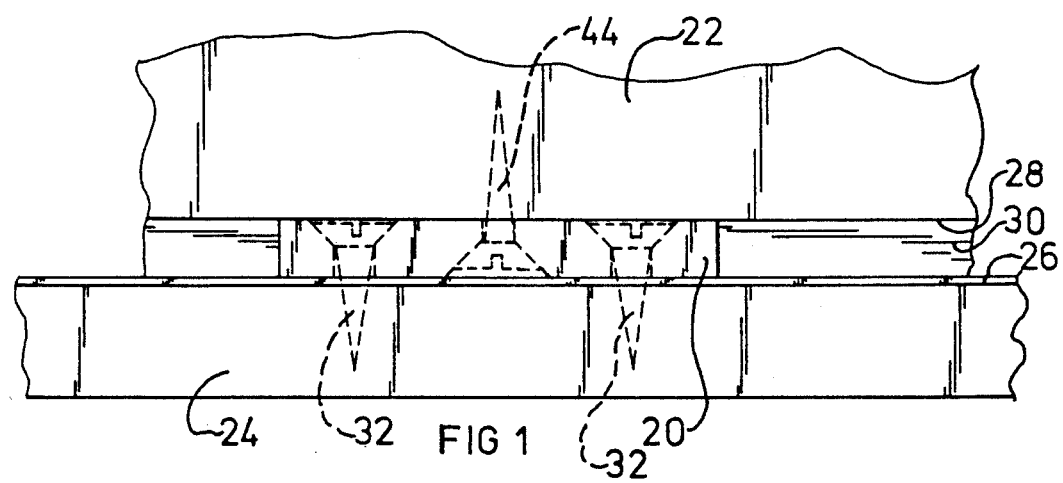
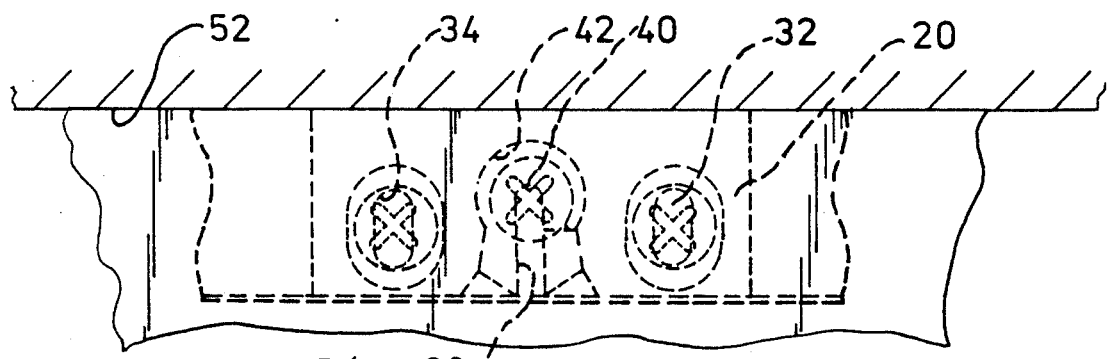
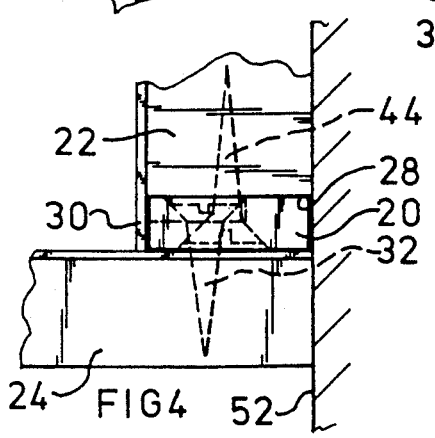
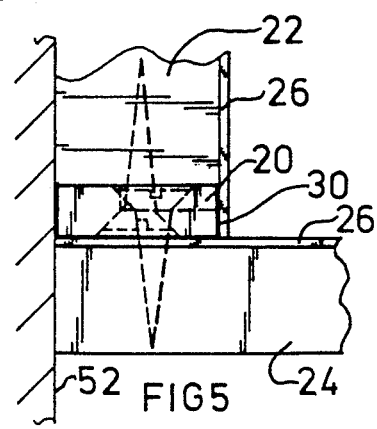

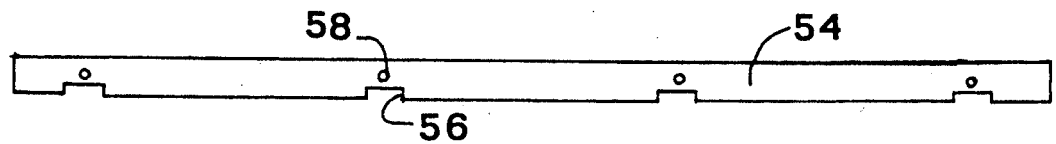
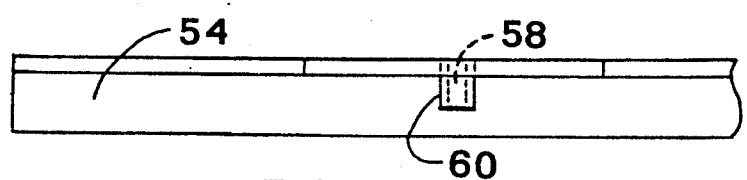
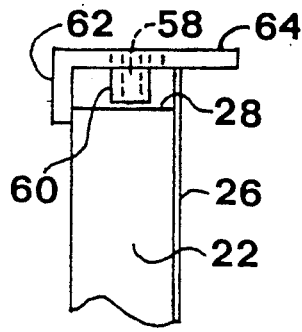
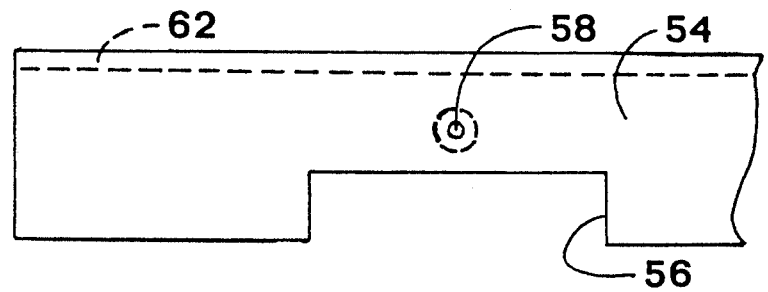
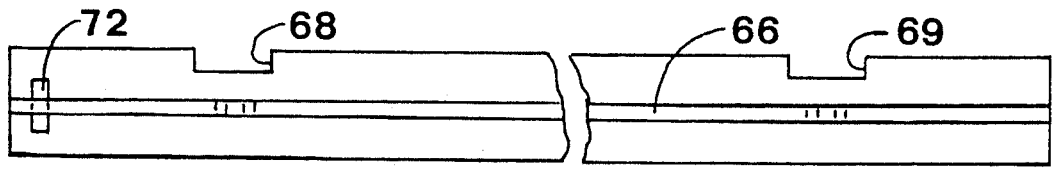
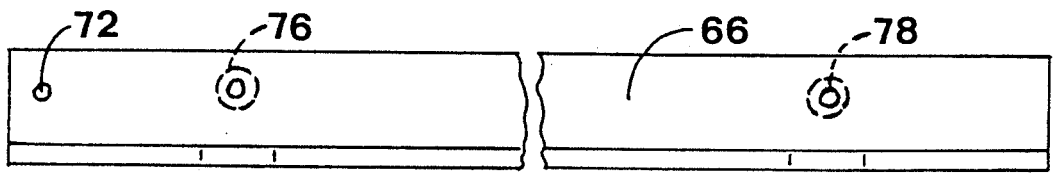
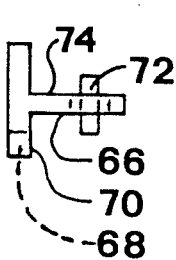
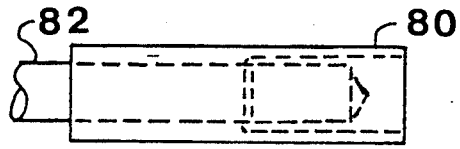
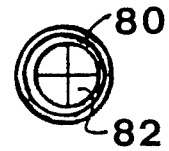

METHOD AND DEVICE TO ATTACH A BACKSPLASH TO A COUNTERTOP

This is a divisional of copending application Ser. No. 07/079,345 filed on 07/30/87, and now U.S. Pat. No. 4,881,844.

BACKGROUND OF THE INVENTION

The field of the invention pertains to small clips and similar devices to attach one object to another in permanent or semi-permanent manner. In particular, the clips are generally simple in configuration and relatively easy to install. Over the years a multitude of specialized clips have been invented and patented. A sampling of such clips are described briefly as follows:

T-slot clips, disclosed in U.S. Pat. Nos. 465,472 and 1,432,349, include a wedging slope to frictionally retain a screw head in the slot portion. The screw head is first inserted in the large hole at one end of the slot. A variation is disclosed in U.S. Pat. No. 3,596,942 wherein the clip includes an open ended L-shaped slot having wedging shoulders and a flat to engage a screw head.

U.S. Pat. No. 4,473,316 and British Pub. Applic. No. 2,121,099A both disclose clips for hidden joints in modular furniture. The clips incorporate modified key holes with wedging shoulders; however, the former utilizes a flat land for the screw head and the latter an internal locking flange abutting the screw head.

An attachment specifically directed to fastening a backsplash to a countertop is disclosed in U.S. Pat. No. 4,126,365 wherein a U-shaped channel is fitted into a slot in the back of the backsplash with both extending the length of the backsplash. The leg of the U-shape engages the countertop.

U.S. Pat. Nos. 4,408,923 and 4,545,698 both disclose tensioning clips for furniture joints. The former incorporates a tensioning member drawn in by an engageable rotatable member. The latter discloses a dovetail-like groove in a clip that engages a screw head with laterally sloping wedge-shaped surfaces.

Another dovetail slot, here matched with a dovetail-like element, is disclosed in U.S. Pat. No. 4,357,119 and also directed to joining perpendicular furniture members.

Disclosed in U.S. Pat. No. 4,127,353 is a slotted wedge clip to detachably retain cabinet parts together and permit easy assembly and disassembly.

Currently, countertops and backsplashes are usually installed with a metal trim covering a joint therebetween. This construction collects dirt which is unsightly and unhealthful and eventually the trim discolors or loosens. Other backsplashes are molded smoothly integral with the countertop prior to installation. Such backsplashes can not be tightly fitted to a gently curving wall upon installation. With a view toward eliminating the metal trim and providing a backsplash of neat appearance that can be tightly fitted to the countertop and the wall, applicant has developed the specialized clip and method of installation disclosed below.

SUMMARY OF THE INVENTION

The new clip comprises an oblong flat body pierced by a pair of oblong countersunk holes. Between the countersunk holes is a slot opening to one edge of the body and beveled from the opposite side of the body. The slot terminates with a substantially half-round countersunk hole. The junctures of the beveled sides of the slot with the countersink of the half-round hole are specifically formed to provide a locking shoulder on each side of the half-round hole.

Multiple clips are used to provide a blind fastening between a backsplash and a countertop enabling the backsplash to be driven into permanent substantially watertight engagement with the countertop.

Preferably, the clips are with screws fastened to the countertop at regular intervals and spaced against or at equal intervals from the wall adjacent the countertop. The backsplash is rabbetted along the lower edge and open to the back. Within the rabbet are fastened screws with protruding heads complementary to the clip slots. As the backsplash is driven into position the screw heads attached thereto engage the clip slots and snap over the locking shoulders in the slots.

In the preferred embodiment, the countertop and backsplash are constructed of a hard surfaced material composite such as Formica brand laminate glued to chip board. The backsplash is rabbetted to remove a strip of chip board and provide a short lip of Formica laminate along the lower edge of the backsplash. The short lip of laminate tightly engages the countertop and covers the clips to provide a blind permanent and substantially water tight joint, however, a sealing material behind the lip may optionally be provided to assure water tightness over extended periods of time.

By following the step-by-step installation procedure, backsplashes that are permanent, watertight and more attractive may be more quickly installed to countertops.

DESCRIPTION OF THE DRAWINGS

FIG. 1 is a back view of the clip as installed between a countertop and a backsplash;

FIG. 2 is a top view of the installed clip;

FIG. 3 is a bottom view of the installed clip;

FIGS. 4 and 5 are end views of an installed clip;

FIGS. 14a, 14b, 14c and 14d detail a gauge for setting the clips and screws;

FIGS. 15a, 15b and 15c detail a compact guage for setting the clips and screws; and FIGS. 16a and 16b detail a screw setting tool for the screws that engage the clip slots.

DESCRIPTION OF THE PREFERRED EMBODIMENTS

Figure 6:
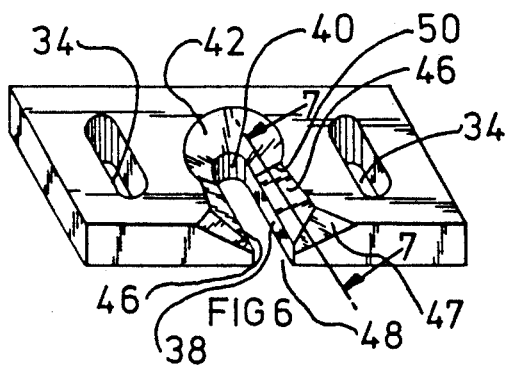
FIG. 6 is a bottom perspective view of a clip.

Illustrated in FIGS. 1 through 5 is an individual clip 20 as installed to retain a backsplash 22 to a countertop 24. The backsplash 22 and countertop 24 are typically constructed of chipboard with a Formica brand hard laminate surface 26 that is impervious to water and difficult to otherwise damage. The backsplash 22 is rabbetted at 28 to remove a portion of the chipboard along the length of the backsplash. There remains a lip 30 of laminate 26 extending downward from the backsplash 22 into very tight contact with the laminate surface 26 of the countertop 24.

Within the rabbet 28 spaced along the length of the backsplash 22 are the clips 20. The clip 20 shown in fastened tightly with screws 32 to the countertop 24. The clip 20 has a pair of oblong holes 34 countersunk at 36 for the screws 32. The clip 20 also includes a slot 38 terminating with a hole 40 countersunk at 42 from the opposite side of the clip. A third screw 44 attaches the clip 20 through the hole 40 to the backsplash 22.

Figure 8:
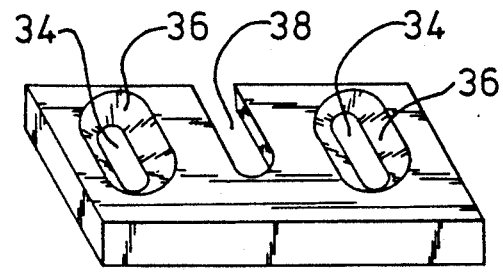
FIG. 8 is a top perspective view of a clip.
Figure 7:
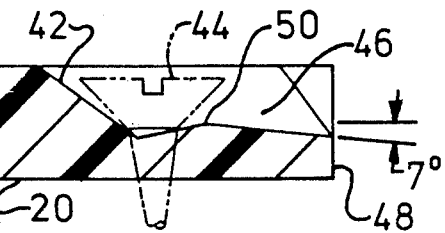
FIG. 7 is a partial section taken along the line 7—7 of FIG. 6.

FIGS. 6, 7 and 8 illustrate the clip 20 in more detail. The clip 20 comprises an oblong flat body having a pair of oblong holes 34 that are countersunk 36. Therebetween is a slot 38 terminating in half-round hole 40 countersunk at 42. The slot is beveled at 46 and is open to the clip edge at entrance 48. At the junctures of the bevels 46 and the countersink 42 are carefully formed shoulders 50 that provide a change in slope to latch the screw head into the half-round hole 40 and countersink 42. At the entrance 48 the bevels 46 are further chamfered 47 to better lead in the head of screw 44.

In the particular embodiments tested, the clips 20 have been formed of aluminum and nylon plastic such as DuPont Zytel ST 801. The nylon clip dimensions overall are, in inches, 2×0.63×0.25. The countersinks 36 are standard 82° to a depth of 0.18 inches and the countersink 42 to a depth of 0.175 inches. The oblong holes 34 have dual centers 0.1 inches apart. The bevels 46 have a combined angle of 90° and rise from the slot entrance 48 at a 7° slope for 0.37 inches along the inside edge of the slot 38 to form the shoulder at the juncture with the countersink 42. The slot 38 is 0.18 inches in width and the bevel 0.095 inches deep at the shoulder. The slot and bevels are substantially widened 47 at the entrance 48. These dimensions for the bevels, slots and countersinks are tailored to a phillips cross-slot No. 8 flat head screw and would likely be slightly changed for different screw configurations, however, the wedging and latching principle remains the same.

In conjunction with the use of clips and screws of the above dimensions, the rabbet 28 is formed to an accurate depth of 0.277±0.005 inches. The latching screw 44 is driven to a depth limited to provide protrusion of the screw head for a tight latching fit. The protrusion can be set manually by temporarily attaching the clips 20 to the backsplash rabbet with latching screw 44, backing the screw out one full turn to release the clip and then retightening one full turn. Disclosed below is a tool to set the latching screws 44 to the proper depth automatically.

Figure 12:
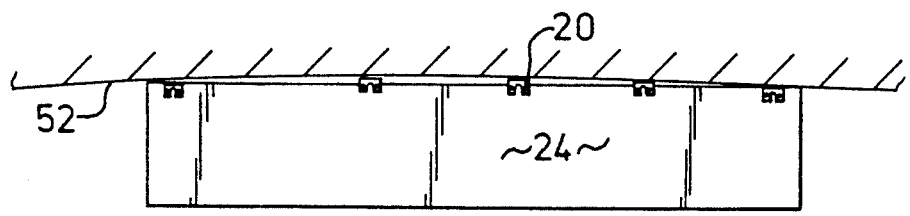
FIG. 12 is a top view of a countertop prior to attachment of the backsplash.

As shown in FIGS. 2 through 5, the backsplash 22 and countertop 24 are typically against a wall 52. In some installations the wall 52 may be slightly curved as shown in FIG. 12. Clips 20 are spaced apart and fastened to the countertop 24 with screws 32 through holes 34. The clips 20 are positioned against the wall 52 or at equal distances from the wall. Screws 44 are attached to the backsplash 22 in the rabbet 28 at locations complementary to the clip slots 38.

Figure 9:
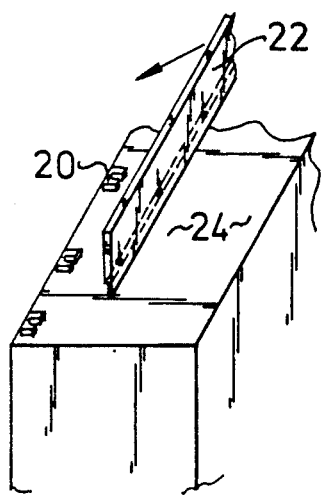
FIGS. 9, 10 and 11 illustrate installation of a backsplash.
Figure 10:
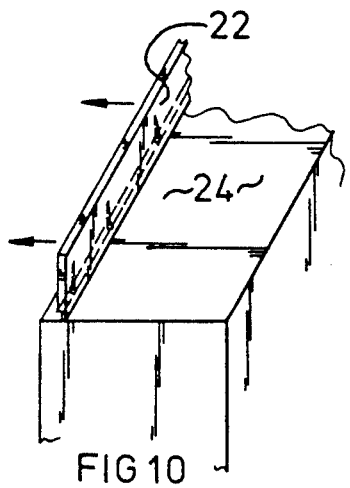
Figure 11:
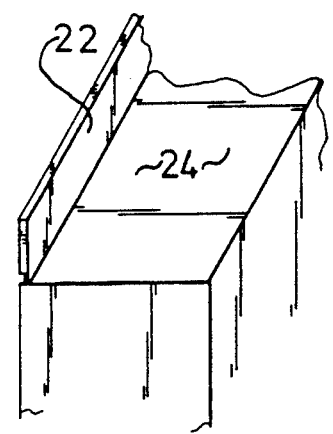
Figure 13:
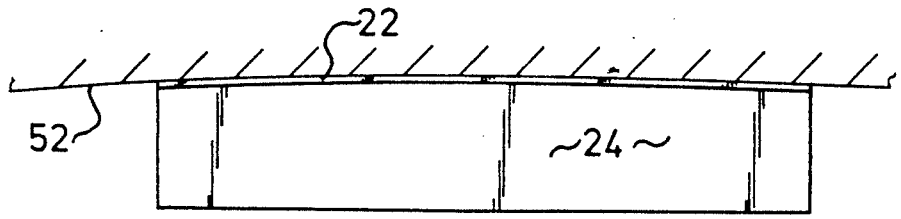
FIG. 13 is a top view of the countertop of FIG. 12 with the backsplash attached.

As shown in the sequence of FIGS. 9 through 11, the backsplash 22 is placed down against the countertop 24. Optionally a bead of adhesive sealant is extruded to the countertop surface along the line of future contact with the laminate lip 30. The backsplash 22 is driven forward as shown in FIG. 10 until tight to the clips 20 and wall 52 as shown in FIGS. 11 and 13. The tight fit of the laminate lip 30 scrapes any excess sealant from the countertop 24 and the backsplash is tightly wedged and latched to the countertop.

As shown in FIG. 12, the countertop 24 need not be scribed to the wall 52. The backsplash 22 is tightly fitted and moves with the countertop 24 and, within the flexibility of the backsplash, follows the curvature of the wall 52.

In an alternative embodiment, the clips 20 may be fastened first into the rabbet 28 with the screws 32 and the latching screws 44 attached to the countertop 24 at equal distances from the wall 52.

Fixtures for spacing the clips and setting the latching screws are illustrated in FIGS. 14, 15 and 16. The drill guide comprises an L-shaped section 54 of suitable length having notches 56 at suitable spacings. Above the notches 56 are holes 58 with attached collars or drill bushings 60. By placing the guide on the countertop, the clips 20 can be located and two holes drilled quickly through the holes 34 in the clips. By placing the guide 54 short leg 62 against the back of the backsplash 22 and the long leg 64 over the laminate lip 30, the collars 60 are in the rabbet 28 and the holes 58 located for drilling into the backsplash. To assure a proper match-up the guide must be located on the countertop and backsplash longitudinally from the same location.

Illustrated in FIG. 15 is a more compact fixture for spacing the clips and latching screws. The compact drill guide comprises a T-section 66 having a pair of spaced notches 68 and 69 formed in one leg 70. Adjacent one end of the T-section 66 is a press fit pin 72 protruding from both sides of the center leg 74. Also press fit into the center leg 74 are a pair of drill bushings 76 and 78 with holes of substantially the same diameter as the pin 72.

In the drill guide of FIG. 14, the notches 56 and holes 58 are suitably centered 12 inches apart, for example. In the compact drill guide the nearest notch 68 and drill bushing 76 are centered 3 inches from the inside edge of the pin 72 and the furthest drill bushing 78 is centered 12 inches from the center of the pin 72. The furthest notch 69, however, is centered 12 inches from notch 68.

With the drill guide of FIG. 14, several holes in the countertop and backsplash can be drilled before the clips and latching screws are attached. With the compact drill guide of FIG. 15, however, each clip serves to locate the next clip in sequence and each hole serves to locate by means of pin 72 the next hole for a latching screw.

In FIG. 16, a screw sitting tool for repeatedly driving latching screws to the proper depth is shown. The tool comprises a collar 80 press fit over a phillips head bit 82. For No. 8 screws and the clips dimensioned above, the collar 80 extends 0.11 inches beyond the tip of the bit 82.

I claim:

1. A method of installing a backsplash to a countertop, the backsplash comprising a thin hard plastic laminate bonded to a thick substantially wooden substrate, the method comprising, rabbeting a groove in the bottom of the backsplash in width substantially the thickness of the substrate, thereby leaving a hard plastic laminate lip protruding therefrom, spacing a plurality of latching screws in the rabbet groove, and driving said screws into said substrate to a predetermined depth, spacing on a countertop a plurality of slotted clips complementary to the latching screws and sized to fit within the backsplash rabbet groove, and fastening the slotted clips to the countertop;

placing the backsplash vertically on the countertop in front of the clips and with the laminate lip contacting the countertop, and driving the backsplash in a horizontal direction perpendicular to the rabbet groove into position with the latching screws passing through the clip slots and latching therein.

2. The method of claim 1 including the step of placing a bead of sealant on the countertop at the backsplash laminate lip final location just prior to placing the backsplash vertically on the countertop.

3. The method of claim 1 including spacing the latching screws and clips with a notched drill guide and setting the latching screws with a collared bit.

4. In a method for installing a backsplash to a countertop utilizing backsplash clips, the steps of, providing a plurality of backsplash clips each comprising a generally oblong body having a top and bottom, ends and long sides extending therebetween, a pair of holes extending through the body from top to bottom, said holes spaced apart and adjacent the ends of the body, a straight slot extending from top to bottom and having opposed slot sides and a slot entrance thereto through one long side of the body between said holes, said slot perpendicular to said long side and said slot terminating in a half-round hole through the body, at least a portion of said opposed slot sides parallel to each other, a half-round countersink bevel extending about the half-round hole and extending upwardly from the bottom of the body, a pair of side bevels extending upwardly from the bottom of the body on the sides of the slot, said side bevels extending in an outward direction relative to the slot, said side bevels generally narrowing from the slot entrance to junctures with the half-round countersink bevel, and said junctures comprising a pair of shoulders formed by an abrupt change in slope from each side bevel to the half-round countersink bevel at each juncture, rabbeting a groove in the bottom of the backsplash, thereby leaving a laminate lip protruding therefrom, spacing a plurality of latching screws in the rabbet groove, and driving said screws into said backsplash to a predetermined depth, spacing on a countertop a plurality of the backsplash clips complementary to the latching screws and sized to fit within the backsplash rabbet groove, and fastening the backsplash clips to the countertop;

placing the backsplash vertically on the countertop in front of the clips and with the laminate lip contacting the countertop, and driving the backsplash in a horizontal direction perpendicular to the rabbet groove into position with the latching screws passing through the clip slots and latching therein.

5. The method of claim 4 including spacing the latching screws and clips with a notched drill guide and setting the latching screws with a collared bit.

6. In a method for installing a backsplash to a countertop utilizing backsplash clips, the steps of providing a plurality of backsplash clips each comprising a generally oblong body having a top and bottom, ends and long sides extending therebetween, a slot extending from the top to bottom and having opposed slot sides and a slot entrance thereto through one long side of the body, said slot terminating in a half-round hole through the body, at least a portion of said opposed slot sides parallel to each other, a half-round countersink bevel extending about the half-round hole and extending upwardly from the bottom of the body, a pair of side bevels extending upwardly from the bottom of the body on either side of the slot, said side bevels extending in an outward direction relative to the slot, said side bevels generally narrowing from the slot entrance to junctures with the half-round countersink bevel, said junctures comprising a pair of shoulders formed by an abrupt change in slope from each side bevel to the half-round countersink bevel at each juncture and separate means spaced from said slot to fasten the body to an object, rabbeting a groove in the bottom of the backsplash, thereby leaving a laminate lip protruding therefrom, spacing a plurality of latching screws in the rabbet groove, and driving said screws into said backsplash to a predetermined depth, spacing on a countertop a plurality of the backsplash clips complementary to the latching screws and sized to fit within the backsplash rabbet groove and fastening the backsplash clips to the countertop;

placing the backsplash vertically on the countertop in front of the clips and with the laminate lip contacting the countertop, and driving the backsplash in a horizontal direction perpendicular to the rabbet groove into position with the latching screws passing through the clip slots and latching therein.

7. The method of claim 6 including spacing the latching screws and clips with a notched drill guide and setting the latching screws with a collared bit.

* * * * *